May 31, 1960 E. UHER 2,938,408
DIFFERENTIAL V-BELT TRANSMISSION DRIVE
Filed May 13, 1958 2 Sheets-Sheet 1

INVENTOR:
Edmond Uher
BY
Richards & Geier
ATTORNEYS

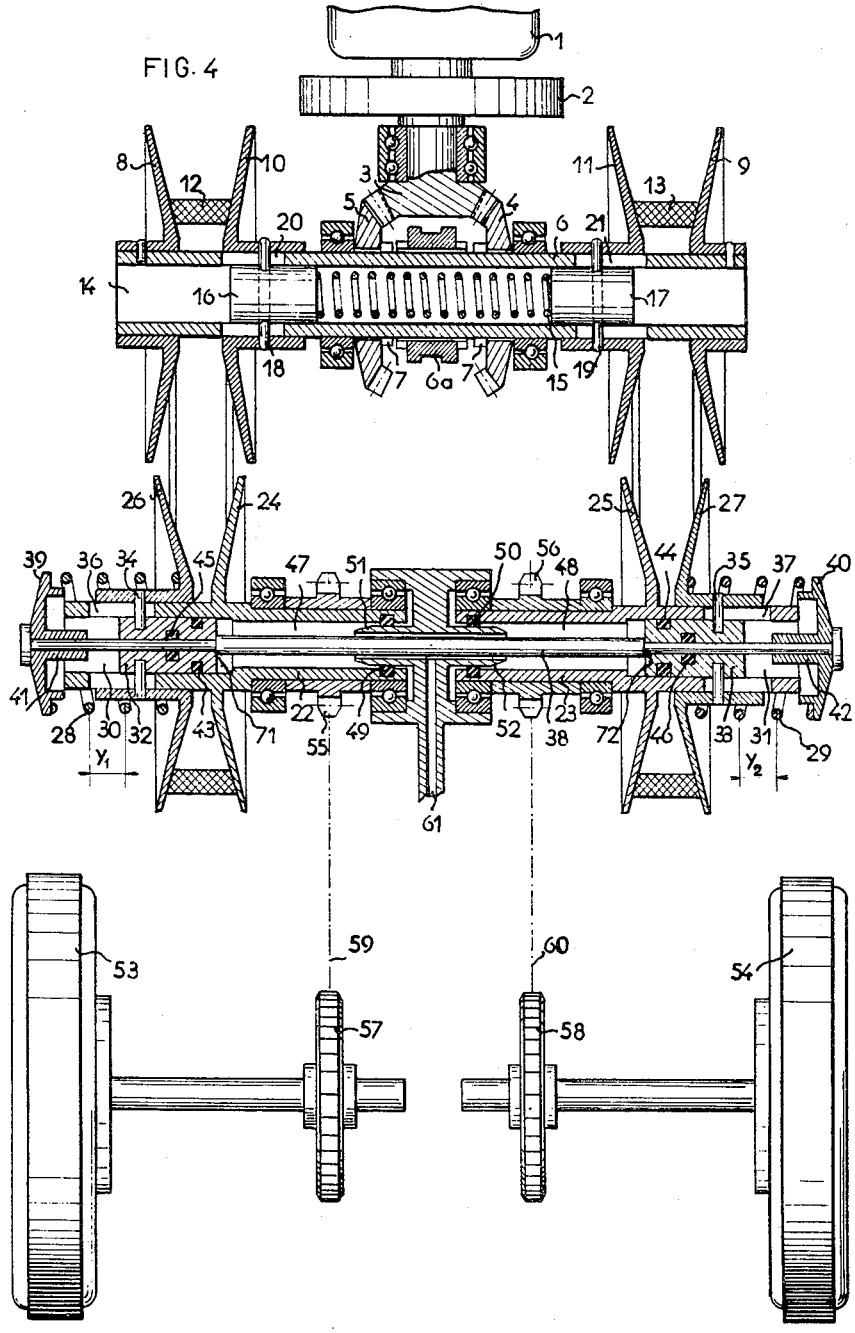

United States Patent Office 2,938,408
Patented May 31, 1960

---

2,938,408
DIFFERENTIAL V-BELT TRANSMISSION DRIVE

Edmond Uher, Chemin des Mougins, Cap d'Antibes, France

Filed May 13, 1958, Ser. No. 734,973

Claims priority, application Austria May 14, 1957

5 Claims. (Cl. 74—722)

This invention relates to V-belt transmission drives intended to be interposed between a vehicle engine and two independent wheels of the latter for ensuring driving of said wheels with a differential effect, i.e. in such a manner that the said wheels may travel, for example, during a turn, different distances without ceasing being driven and without any slippage, either between the wheels and the road or between the V-belts and their pulleys.

An important object of this invention is to provide a V-belt transmission drive of the type described affording a differential effect of a minimum predetermined amplitude whatever may be the value of the mean transmission ratio, not only within the continuous range of variation of said ratio but also when the latter assumes its minimum and maximum values, i.e. as a matter of fact, whatever may be the conditions under which the vehicle is driven.

For this purpose, another object of the invention is to slidably dispose each pair of movable flanges (one of the said pairs including the two movable flanges of the driving pulleys and the other one of the driven pulleys) on an intermediate supporting structure, each assembly comprising one movable flange pair and the associated intermediate structure being slidably mounted in turn with respect to the corresponding fixed flanges. There are thus obtained two separate relative motions, one of which is used for varying the mean transmission ratio while the other one, which is given a greater amplitude, is assigned to the differential effect.

A more particular object of the invention is to provide a differential drive of the type described wherein the movable flanges of each pair may be separately shifted axially with respect to the associated intermediate supporting structure within the usual limits, to thereby ensure a continuous variation of the mean transmission ratio within the usual range, while the assembly including the said movable flanges, and intermediate structure may be shifted in turn axially as a whole within wider limits corresponding to the minimum required amplitude of the differential effect.

It is a further object of the invention to so design all resilient means provided to urge the movable flanges towards the associated fixed flanges that they are freely floating together with the intermediate structures with respect to the fixed parts.

Other objects and advantages of the invention will be apparent from the following detailed description, together with the accompanying drawings submitted for purpose of illustration only and not intended to limit the scope of the invention, reference being had for that purpose to the appended claims.

In the drawings:

Fig. 4 is an elevational partly sectional view of a V-belt differential drive according to the invention.

Figure 1:
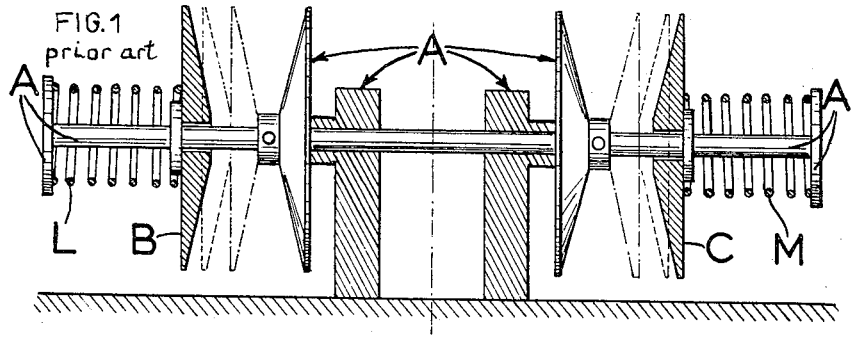
Fig. 1 is a sectional view of a prior art differential transmission drive.

In Fig. 1 of the appended drawings, a major drawback of the existing differential transmission drives has been diagrammatically illustrated—A generally designates the parts which are axially fixed with respect to the vehicle chassis (said parts including the fixed pulley flanges and the fixed abutments, either direct or not). Two movable flanges are indicated at B and C, and to facilitate the understanding it has been assumed that said flanges are those of the driving pulleys. It has been also assumed that the drive is desinged according to the second case mentioned above and, in the construction shown, both movable flanges are located outside the assembly comprising both fixed flanges; the demonstration would be the same in the first case mentioned above or if both movable flanges were disposed between the fixed flanges. Under the conditions assumed, when the flanges B and C assume the position shown in full line, both individual transmission ratios are minima and equal to each other and, hence, both equal to the mean transmission ratio which is also a minimum. In the relative position shown in dot-dash line, both individual transmission ratios as well as the mean transmission ratio are a maximum.

Finally, in the position shown in dotted line, the three ratios have an average value. It may be easily seen in the drawing that in the last mentioned relative position, both flanges B and C can be shifted as a whole by an overall stroke equal to the spacing between the fixed abutments associated with each of them. It is clear that in any other position, the possible common stroke is more reduced and that, in their most spaced as well as in their closest position, the flanges B and C cannot be displaced as a whole anymore.

Figure 3:
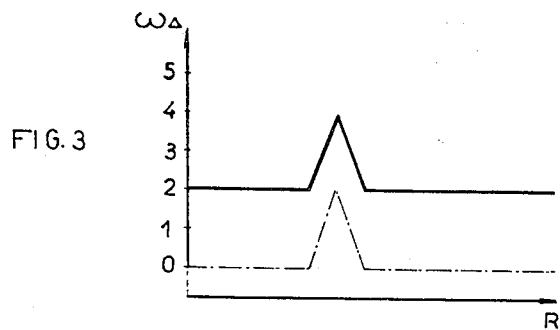
Fig. 3 is a diagram illustratnig the differential effect amplitude curve.

Fig. 3 shows in dot-dash line a curve of the differential effect versus the mean transmission ratio in the above described known device. It may be seen that underneath and beyond the continuous variation range of the mean transmission ratio, the device does not allow for any differential effect and that even within the associated range, it only affords an optimum differential effect at the mid point of said range which corresponds to a mean transmission ratio, equal to unity, between the driving and the driven pulleys. Now, the use of this particular 1/1 mean transmission ratio, is exceptional and moreover, the main fraction of the overall driving time of a vehicle takes place either with a minimum mean transmission ratio (starting, low-speed evolutions, and small radius turns) or with a maximum mean transmission ratio (normal drive), the periods during which the continuous variation of the transmission ratio intervene only representing a minute fraction of the overall driving time. Under these conditions, in the known devices, the differential effect intervenes but occasionally, and when it intervenes, it is optimum only for the 1/1 mean ratio so that its efficiency is practically illusive. In particular, during rapid drive, since the mean transmission ratio has its maximum value, no differential effect can take place, which gives rise to considerable risks, in particular on frozen roads, or the like. On the other hand, the small radius turns which are necessarily effected at very low speed, give rise to important slippage liable to cause objectionable and premature wear.

Figure 2:
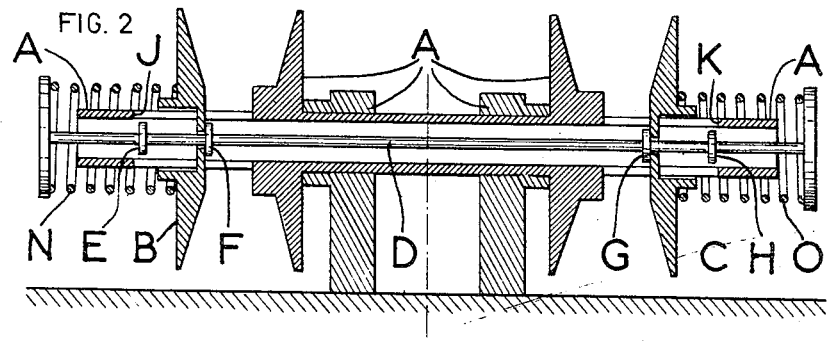
Fig. 2 is a sectional view illustrating the principle of the drive according to the invention.

The principle of the transmission device according to the invention is diagrammatically shown in Fig. 2, still assuming the same conditions as in Fig. 1. "A" designates as previously the axially fixed parts still comprising the fixed flanges of the pulleys and the directly or indirectly acting fixed abutments while B and C are, as previously, the two movable flanges of the driving pulleys. It may be seen that, according to the invention, the movable flanges B and C are slidably mounted on an intermediate supporting structure D, this assembly being in turn slidably mounted on the axially fixed structure A.

In the embodiment shown in Fig. 2, the axial free stroke of the flanges B and C along the intermediate structure D is limited by means of abutments E—F and G—H, respectively, the spacing of which is chosen according to the desired variation range of the mean transmission ratio while the axial free stroke of the assembly B—C—D with respect to the structure A, is limited by means of abutments J and K of which the spacing is greater than that of E—F (or G—H) and is chosen according to the minimum amplitude of differential effect to be obtained.

With this arrangement, it is clear that the assembly B—C—D can always be shifted axially whatever may be the spacing of the movable flanges i.e. whatever is the value of the mean transmission ratio. If the abutments J—K were cooperating directly with the intermediate structure D, the axial shifting of B—C—D would be constant i.e. independent of the mean transmission ratio. Since, however, in the example shown, the said abutments cooperate with the movable flanges proper, the amplitude of the said axial shifting increase when the spacing of the movable flanges assumes values more and more different from one of its extreme values, to reach its maximum for the average value of the said spacing.

In Fig. 3 is shown in full line a corresponding curve of the variations of the differential effect amplitude as a function of the mean transmission ratio. It may be observed that the minimum level of the said curve, all other things being equal, coincides with the maximum level of the dotted line curve expressing the operation of the known drives. Furthermore, in the case of the curve shown in Fig. 3 which corresponds to the conditions defined above in which the fixed abutments of the assembly B—C—D cooperate with the movable flanges B and C, there is obtained, within the limits of the continuous variation range of the mean transmission ratio, a differential effect of greater amplitude which reaches its maximum value for the average value of the mean transmission ratio.

Figs. 1 and 2 also illustrate this second advantage of the invention. In the known drive of Fig. 1 if, for example, from the average position shown in dotted line, the differential effect tends to simultaneously displace the flanges B and C towards the right, the compression of the spring M increases and resists the differential effect while building up the lateral pressure on the right-hand belt.

In contradistinction therewith, in the drive according to the invention which is shown in Fig. 2, under the same conditions, the assembly B—C—D—N—O freely moves as a whole towards the right and the compressions of both springs N and O remain unchanged.

The transmission drive illustrated in Fig. 4 is interposed between an engine 1 and two independently driven wheels 53 and 54. The engine 1 actuates the primary shaft 6 and the drive through an automatic centrifugal clutch 2 and three bevel pinions. The bevel pinions 4 and 5 which continuously mesh with the pinion 3, are freely rotatable on the primary shaft 6 and they are provided with dog teeth 7. By means of a clutch member 6a, which is slidably—but non-rotatably—mounted on the shaft 6, the latter may be selectively coupled with either one of the bevel pinions 4 and 5. Since the latter continuously rotate in opposite ways, this selective clutching permits ensuring forward or rearward drive of the vehicle.

The two driving pulleys which are keyed on the primary shaft 6 comprise respective fixed flanges 8 and 9, and movable flanges 10 and 11. Each one of these driving pulleys cooperates with an individual V-belt, 12 and 13 respectively. The lateral pressure required for clamping the V-belts 12 and 13 between the flanges of the associated pulleys is generated by a compression spring 15 suitably disposed within the hollow shaft 6 and interposed between two blocks 16 and 17 slidably mounted in the bore 14 of said shaft and respectively fast for axial displacement with the movable flanges 10 and 11 through respective gudgeon pins 18 and 19.

In this embodiment, the spring 15 constitutes the axially floatable intermediary structure with respect to which the movable flanges 10 and 11 may be separately shifted axially, while the assembly comprising said flanges and said structure may be, moreover, shifted axially as a whole, with respect to the primary shaft 6. Both relative axial displacements, viz., that of each movable flange with respect to the spring 15 and that of the whole assembly with respect to the shaft 6, are made possible in the example shown by suitably dimensioned longitudinal slots 20 and 21 of the primary shaft 6.

The driven shafts 22 and 23 are separated from each other but axially aligned. On each of them is keyed one of the driven pulleys which also comprise respective fixed flanges 24—25, and movable flanges 26—27. In the example shown, the secondary shafts 22 and 23 are also hollow and piston members 32 and 33 are slidably mounted in their respective bores 30 and 31, said pistons being respectively fast for axial displacement with the flanges 26 and 27 by means of respective gudgeon pins 34 and 35. According to the invention, the flanges 26 and 27 are individually slidable on an intermediary floating structure comprising a rod 38, between abutments 41 and 71, on the one hand, and 72 and 42, on the other hand, and the assembly comprising both flanges and the rod 38 is floatable axially as a whole with respect to the secondary shafts 22—23.

In this case also, all these axial displacements are made possible due to the presence of suitably dimensioned longitudinal slots 36 and 37 accommodating the gudgeon pins 34 and 35, respectively. Furthermore, in the embodiment shown in Fig. 4, compression springs 28 and 29 are respectively interposed between caps 39 and 40 fixedly secured on the rod 38 and the movable flanges 26 and 27. The overall strength of the springs 28 and 29 is greater than the strength of the spring 15, but the springs 28 and 29 have the same strength. The pistons 32 and 33 are provided with outer packing rings 43 and inner packing rings 45 to make them tight with respect to the secondary shaft walls, as well as to the rod 38. The secondary shafts 22 and 23 are journalled on ball bearings and they are mounted at their closest ends on an inner fixed head. The secondary shafts 22 and 23 separately drive the wheels 53 and 54 through suitable chain gears 55—59—57 and 56—60—58.

The control of the mean transmission ratio may be effected by any suitable means within the scope of the invention. In the example shown, however, the control is hydraulic and preferably of the type described in the U.S. patent application Ser. No. 724,047 filed March 26, 1958 for "Automatic Variable Speed Drive."

The required pressure oil is brought into the cylindrical spaces 47 and 48 comprised between the pistons 32 and 33 through a tube 61 and an axial annular passage provided between the rod 38 and an axial duct 52 surrounding said rod. The required tightness of the spaces 47 and 48 is ensured by rotary joints 49 and 50 respectively. It is to be noted that such a hydraulic control is particularly well adapted to a transmission drive according to the invention since the free communication through said tube 52 between the spaces 47 and 48 of the bores 30 and 31 make the mass of liquid comprised between the pistons 32 and 33 axially floatable, together with the above-mentioned intermediate floating structure.

The operation of the transmission drive according to the invention is as follows:

The configuration shown in Fig. 4 corresponds to conditions in which the mean transmission ratio is a minimum, the wheels 53 and 54 furthermore rotating at the same speed. In this configuration, the flanges 26 and 27 are held in their closest relative position under the prevailing action of the springs 28 and 29, and they rest against the abutments 71 and 72 of the rod 38 through the pistons 32 and 33. The flanges 10 and 11 also assume their closest relative position since their spring 15 cannot overcome the prevailing action of the springs 28 and 29. Under these conditions, the belts 12 and 13 are clamped between the flanges of the pulleys under the only action of the spring 15. On the other hand, the tensions of both belts 12 and 13 are equal to each other so that the floating structure comprising the movable flanges 10, 11, 26 and 27, the rod 38 and its caps 39 and 40 and the springs 15, 28 and 29 is held in its mid axial position.

If the hydraulic pressure in the cylindrical space 47—48 happens to build up (i.e. in response to acceleration of the engine if the hydraulic control is of the type described in the above cited patent application) when the said pressure becomes sufficient to overcome, together with the spring 15, the overall resistance of both springs 28 and 29, the latter are further compressed and the flanges 26 and 27 are simultaneously taken away from the flanges 24 and 25. Now, if the wheels 53 and 54 rotate at the same speed (for example when the vehicle runs straight) the tensions of the driving sides of the belts are equal to each other and both belts tend to penetrate ot the same extent into the driven pulleys. Therefore, their radii also tend to increase to the same extent on both driving pulleys so that the spring 15 is made free of taking the movable flanges 10 and 11 away from each other. Both individual transmission ratios as well as the mean transmission ratio then increase in the same proportion. Such increasing goes on until a condition of equilibrium is established between the hydraulic pressure and the action of the springs.

If the pressure further builds up, the transmission ratios further increase until they reach their maximum value when the pistons 32 and 33 are simultaneously brought into contact with the abutments 41 and 42. The same sequence of events obviously happens but in the reverse order as the hydraulic pressure drops down.

Now, with a minimum value of the mean transmission ratio (configuration shown in Fig. 4) if, e.g. the wheel 54 begins rotating faster than the wheel 53 (for instance due to a turn of the vehicle) the tension of the driving side of the belt 13 becomes higher than that of the driving side of the belt 12. The belt 13 therefore tends to penetrate deeper into the driven pulley 25—27. Since the assembly 26, 27, 32, 33, 39, 40, 28 and 29 is freely floatable with respect to the secondary shafts, the said assembly is shifted as a whole towards the right and the effective radius of the belt 12 on the driven pulley 26—24, increases. In the same time, the tension of the loose side of the belt 13 is reduced and the spring 15 is then made capable of increasing the effective radius of the said belt on the driving pulley 9—11, while the tension of the loose side of the belt 12 increases so that the said last mentioned belt penetrates deeper into the driving pulley 8—10. Since the assembly 10—15—11 is freely floatable with respect to the primary shaft, the same assembly can be freely shifted as a whole towards the right without modifying the compression of the spring 15. Under these conditions, the mean transmission ratio keeps its minimum value but the individual transmission ratio between the pulleys 9—11 and 25—27 is increased while the individual transmission ratio between the pulley 8—10 and the pulley 26—24 is reduced to a corresponding extent so that the wheel 54 can rotate faster than the wheel 53 without any slippage. It will be noted that during the whole above described sequence of events, the pistons 32 and 33 have remained abutted at 71 and 72 so that the lateral pressure on the belts 12 and 13 has been ensured solely by the spring 15 and since the compression of the latter has remained unchanged, the said pressure has been kept constant. It is also to be pointed out that the above described operation process remains the same for each value of the mean transmission ratio, the fixed abutments 71 and 72 being replaced for ratios other than the minimum one by the mass of non-compressible liquid interposed between the pistons 32 and 33 and which, in the same manner as the said fixed abutments, cancels the action of the springs 28 and 29. Finally, it will be easily understood that in the device according to the invention, the variation of the mean transmission ratio proceeds independently of the differential effect so that the latter may happen for any value of the said ratio and so that the said ratio may vary either during the differential effect or when the independent wheels rotate at the same speed.

Figure 5:
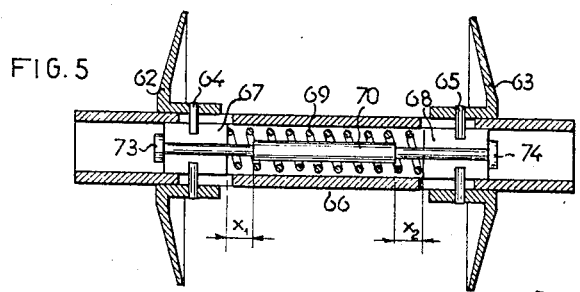
Fig. 5 shows an alternative construction of the intermediary floating structure of the primary shaft.

In the alternative structure shown in Fig. 5, the positive axial abutments of the floating structure are associated with the primary shaft instead of being disposed within the secondary shafts, as shown in Fig. 4. The embodiment of the invention shown in Fig. 5 may be substituted for the conventional piston and spring arrangement 15—16—17 of Fig. 4.

For this purpose, the blocks 67 and 68 axially fast with the movable flanges 62 and 63 of the driving pulleys are slidably mounted on a rod 70 between inner shoulderings of the latter and outer heads 73—74. The flanges 62 and 63 are urged away from each other as previously by the compression spring 69. This whole assembly is, as previously, floatable axially as a whole with respect to the primary shaft 66 through suitably dimensioned longitudinal slots accommodating the respective gudgeon pins 64 and 65.

What I claim is:

1. In a variable multibelt transmission comprising a tubular rotary shaft and a pair of axially spaced pulleys mounted on said shaft to rotate therewith, each pulley including two flanges adapted to engage the sides of a V-belt therebetween, one of said flanges being fixed axially and the other being movable axially between a position in which said two flanges form a minimum effective pulley diameter and a position in which they form a maximum effective pulley diameter, two axially spaced pistons slidable in said tubular shaft and drivingly connected each with one of said movable flanges, respectively, resilient means arranged to urge said movable flanges towards the position of minimum pulley diameter, and a floating structure in said tubular shaft providing abutment surfaces at opposite sides of each piston to engage the same upon relative movement between said structure and said pistons, the distance between the abutment surfaces at either side of each piston being smaller than the distance between the positions of said pistons coresrponding to the positions of minimum and maximum effective pulley diameter of said movable flanges, whereby movement of one of said movable flanges relative to the other movable flange and towards the position of maximum effective pulley diameter will cause said structure to move in the same direction when both pistons are in abutting contact with one of said abutment surfaces, respectively.

2. In a variable multibelt transmission comprising a tubular rotary shaft and a pair of axially spaced pulleys mounted on said shaft to rotate therewith, each pulley including two flanges adapted to engage the sides of a V-belt therebetween, one of said flanges being fixed axially and the other being movable axially between a position in which said two flanges form a minimum effective pulley diameter and a position in which they form a maximum effective pulley diameter, two axially spaced pistons slidable in said tubular shaft and drivingly connected each with one of said movable flanges, respectively, resilient means arranged in said tubular shaft to urge said pistons and consequently said movable flanges towards the position of minimum effective pulley diameter, each piston formed with an axial bore, a rod extending through said bores with a sliding fit therein, and abutment surfaces formed on said rod on opposite sides of each piston in axially spaced relation therewith so as to engage said pistons upon relative movement between said rod and said pistons, the distance between the abutment surfaces on either side of each piston being smaller than the distance between the positions of each piston corresponding to the positions of minimum and maximum effective pulley diameter of said movable flanges.

3. In a variable multibelt transmission comprising two coaxially aligned tubular rotary shafts, a pair of axially spaced pulleys mounted each on one of said shafts, respectively, to rotate therewith, each pulley including an inner flange and an outer flange adapted to engage the sides of a V-belt therebetween, the inner flange being fixed axially and the outer flange being movable axially between a position in which said two flanges form a minimum effective pulley diameter and a position in which they form a maximum effective pulley diameter, two pistons slidable each in one of said tubular shafts, respectively, and drivingly connected each with one of said movable flanges, respectively, each piston formed with an axial bore, a rod passing through said bores with a sliding fit therein and projecting outwardly from the outer ends of said tubular shafts, two disc members mounted each on one of said outwardly projecting ends of the rod, respectively, two compression springs interposed each between one of said movable flanges and one of said disc members, respectively, to urge said movable flanges towards the position of minimum effective pulley diameter, and abutment surfaces provided on said rod on opposite sides of each piston in axially spaced relation therewith so as to engage the pistons upon relative movement between said rod and said pistons, the distance between the abutment surfaces on either side of each piston being smaller than the distance between the positions of said pistons corresponding to the positions of minimum and maximum effective pulley diameter of said movable flanges.

4. In a variable multibelt transmission comprising two coaxially aligned tubular independent shafts, a pair of axially spaced driven pulleys mounted each on one of said shafts, respectively, to rotate the same, each pulley including an inner flange and an outer flange adapted to engage the sides of a V-belt therebetween, the inner flange being fixed axially and the outer flange being movable axially between a position in which said two flanges form a minimum effective pulley diameter and a position in which they form a maximum effective pulley diameter, a non-rotatable sleeve structure interconnecting the inner ends of said two tubular shafts, two pistons slidable each in one of said shafts to define therewith and with said sleeve structure a pressure chamber of variable volume, each piston being drivingly connected with one of said movable flanges, respectively, and each piston being provided with an axial bore, a rod passing through said bores with a sliding fit therein and projecting outwardly from the outer ends of said tubular shafts, two disc members mounted each on one of said outwardly projecting ends of the rod, respectively, two compression springs interposed each between one of said movable flanges and one of said disc members, respectively, to urge said movable flanges towards the position of minimum effective pulley diameter, means for conducting pressure fluid into said pressure chamber to move said pistons and consequently said movable flanges against the action of said compression springs towards the position of maximum effective pulley diameter, and abutment surfaces provided on said rod on opposite sides of each piston in axially spaced relation therewith so as to engage said pistons upon relative movement between said rod and said pistons, the distance between the abutment surfaces on either side of each piston being smaller than the distance between the positions of the pistons corresponding to the positions of minimum and maximum effective pulley diameter of said movable flanges.

5. A variable multibelt transmission for a motor vehicle having two driven wheel axles, comprising, in combination, a tubular rotary shaft driven by said motor, a pair of axially spaced driving pulleys mounted on said shaft to rotate therewith and each pulley including two flanges adapted to engage the sides of a V-belt therebetween, one of said flanges being fixed axially and the other being movable axially towards and from said fixed flange, two axially spaced piston-like wall members slidable in said tubular shaft and drivingly connected each with one of said movable flanges, respectively, a compression spring arranged in said tubular shaft to urge said two wall members and consequently said movable flanges towards their associated fixed flanges, two coaxially aligned independent tubular shafts extending substantially parallel to said motor driven shaft, a pair of axially spaced driven pulleys mounted each one of said independent shafts, respectively, to rotate therewith and including each two flanges one of which is fixed axially and the other of which is movable axially between a position in which said two driven pulley flanges form a minimum effective pulley diameter and a position in which they form a maximum effective pulley diameter, two pistons slidable each in one of said independent shafts, respectively, and drivingly connected each with one of said movable driven pulley flanges, respectively, resilient means arranged to urge said movable driven pulley flanges towards the position of minimum effective pulley diameter, a floating structure extending through said pistons and throughout both independent tubular shafts and provided with abutment surfaces located at opposite sides of each piston in axially spaced relation therewith so as to engage one of said piston sides upon relative movement between said structure and said pistons, the distance between the abutment surfaces at either side of each piston being smaller than the distance between the positions of said pistons corresponding to the positions of minimum and maximum effective pulley diameter of said movable driven pulley flanges, means for moving said pistons and consequently said movable driven pulley flanges against the action of said resilient means towards the position of maximum effective pulley diameter, two V-belts, each trained over one of said driving pulleys and over one of said driven pulleys, respectively, and means for transmitting the drive from said independent shafts to said wheel axles.

References Cited in the file of this patent
UNITED STATES PATENTS

| | | |
|---|---|---|
| 2,420,100 | Salsbury | May 6, 1947 |
| 2,529,489 | Curtis | Nov. 14, 1950 |
| 2,582,966 | Curtis | Jan. 22, 1952 |
| 2,754,691 | May | July 17, 1956 |